(12) United States Patent
Lee

(10) Patent No.: US 6,945,159 B2
(45) Date of Patent: Sep. 20, 2005

(54) TRAY ASSEMBLY FOR MICROWAVE OVEN INCORPORATING TOASTER

(75) Inventor: Jong Woog Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/474,996

(22) PCT Filed: Sep. 4, 2003

(86) PCT No.: PCT/KR03/01814

§ 371 (c)(1),
(2), (4) Date: Oct. 17, 2003

(87) PCT Pub. No.: WO2004/025996

PCT Pub. Date: Mar. 25, 2004

(65) Prior Publication Data

US 2004/0221744 A1 Nov. 11, 2004

(30) Foreign Application Priority Data

Sep. 11, 2002 (KR) .................... 10-2002-0054981

(51) Int. Cl.[7] .................... A47J 37/00; A47J 37/03; H05B 6/68
(52) U.S. Cl. .................... 99/357; 99/385; 99/389; 219/679; 219/702; 219/720
(58) Field of Search .................... 99/331–333, 357, 99/385–391, 326–330; 219/680, 681, 390, 395, 679, 719, 720, 506, 702, 756; 345/87, 104, 50; 349/1, 16; D7/351

(56) References Cited

U.S. PATENT DOCUMENTS 5,834,745 A  * 11/1998  Aoki et al. .................. 219/720
6,013,908 A  *  1/2000  Kume et al. ................. 219/719
6,080,963 A  *  6/2000  Cardillo et al. ............. 219/388
6,539,840 B2 *  4/2003  Choi et al. .................... 99/331
6,772,678 B2 *  8/2004  Choi et al. .................... 99/331

FOREIGN PATENT DOCUMENTS

DE    2515348 A1    10/1976
EP    1 213 948 A2   6/2002

OTHER PUBLICATIONS

International Search Report, Austrian Patent Office, Nov. 26, 2003.

* cited by examiner

Primary Examiner—Timothy F. Simone
(74) Attorney, Agent, or Firm—McKenna Long & Aldridge LLP

(57) ABSTRACT

A microwave oven incorporating a toaster (400) includes a toaster door (440) provided on a toaster panel (430) for opening and closing at least one toaster entrance (421) and a tray assembly (460). The tray assembly (460) includes a tray support (462) provided inside the toaster (400) and at least one tray securely provided on top of the tray support (462) for holding a food item. The tray (461) is declined toward a front end of the tray (461) so as to enable the food item to slide down toward the front end of the tray (461), and it includes at least one elevating bracket (465) for maintaining a predetermined angle and a predetermined distance between the tray (461) and the tray support (462). The microwave oven incorporating a toaster (400) further includes a support wall provided at the front end of the tray (461) for supporting the food item so as to prevent from falling off from the tray (461). Due to the declined orientation of the tray (461) the food item can be positioned toward the end of the tray (461) and a user may easily remove the food item from the toaster (400).

20 Claims, 5 Drawing Sheets

TRAY ASSEMBLY FOR MICROWAVE OVEN INCORPORATING TOASTER

This application claims the benefit of International Patent Application No. PCT/KR03/01814, filed on Sep. 4, 2003, which claims benefit of Korean Patent Application No. KR2002-0054981, filed Sep. 11, 2002, which are hereby incorporated by reference for all purposes as if fully set forth herein.

TECHNICAL FIELD

The present invention relates to a microwave oven, and more particularly, to a tray assembly for a microwave oven incorporating a toaster.

BACKGROUND ART

Generally, microwave ovens such as those illustrated in FIG. 1, heat objects (e.g., food) by applying microwaves to them. Referring to FIG. 1, the microwave oven includes a main body 10 including a front case 11, an outer case 12, and an outer frame 13, a cavity 20 in which an object may be heated by microwaves, and an electrical device chamber 30. The front case 11 forming the front side of the main body 10 includes a cavity door, which opens or closes the cavity 20. The outer frame 13 forms the lower and rear sides of the main body 10, and it protects the cavity 20 and the electrical device chamber 30 together with the outer case 12 and the front case 11. Microwaves may be generated by various electrical devices accommodated with the electrical device chamber 30 provided near the cavity 20. The various electrical devices may include, for example, a magnetron 31 for generating microwaves, a high-voltage transformer 32 for supplying high voltage to the magnetron 31, and a fan 33 generating an air flow inside the electrical device chamber 30 thereby cooling the various electrical devices as they may become heated.

While conventional microwave ovens heat objects using microwaves, microwaves cannot be used to toast food (e.g., bread products such as a slice of bread or bagel). Therefore, microwave ovens capable of toasting food as well as heating an object using microwaves have become desirable. In addition, the existing toasters often have problems when removing a food item. Therefore, microwave ovens incorporating a toaster that has a tray assembly which enables a user to easily insert and remove a food object into or from the toaster is highly desirable.

DISCLOSURE OF INVENTION

Accordingly, the present invention is directed to a tray assembly for a microwave oven incorporating a toaster that substantially obviates one or more problems due to limitations and disadvantages of the related art.

An object of the present invention is to provide a tray assembly for a microwave oven incorporating a toaster that enables a food item to be positioned at a desired position so that a user can easily remove the food item from the toaster.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a tray assembly for a microwave oven incorporating a toaster according to the present invention includes a microwave cavity, a toaster arranged adjacent to the microwave cavity, a tray support provided inside the toaster, and at least one tray securely provided on top of the tray support for holding a food item. The tray may be declined toward a front end of the tray with respect to ground so as to enable the food item to slide toward the front end of the tray. The tray may include at least one elevating bracket for maintaining a predetermined distance and a predetermined angle between the tray and the tray support.

The tray assembly according to the present invention may further include a support wall provided at the front end of the tray for supporting the food item so as to prevent the food item from falling off from the tray. The tray assembly may further include a toaster case for supporting the tray support, a moving slot arranged within the case and oriented parallel to the tray support, and a bushing provided within the moving slot for supporting the tray support and for moving within the moving slot. Furthermore, the tray assembly may further include a connecting link having a first end rotatably coupled to the bushing and a second end, and a toaster door rotatably coupled to the second end of the connecting link. Because the connecting link is provided between the bushing and the toaster door, the tray and the tray support move forward as the toaster door is opened and move backward as the toaster door is closed.

In another aspect of the present invention, a toaster assembly according to the present invention includes a tray support and at least one tray securely provided on top of the tray support for holding a food item. The tray is declined toward a front end of the tray so as to enable the food item to slide toward the front end of the tray. The toaster assembly further includes at least one elevating bracket provided between the tray support and the at least one tray for maintaining a predetermined angel and a predetermined distance between the tray and the tray support, and a support wall provided at the front end of the tray for supporting the food item so as to prevent the food item from falling off from the tray.

The toaster assembly according to the present invention may further include a toaster case for supporting the tray support, a moving slot arranged within the case and oriented parallel to the tray support, and a bushing provided within the moving slot for supporting the tray support and for moving within the moving slot. Furthermore, the toaster assembly may further include a connecting link having a first end rotatably coupled to the bushing and a second end, and a toaster door rotatably coupled to the second end of the connecting link.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
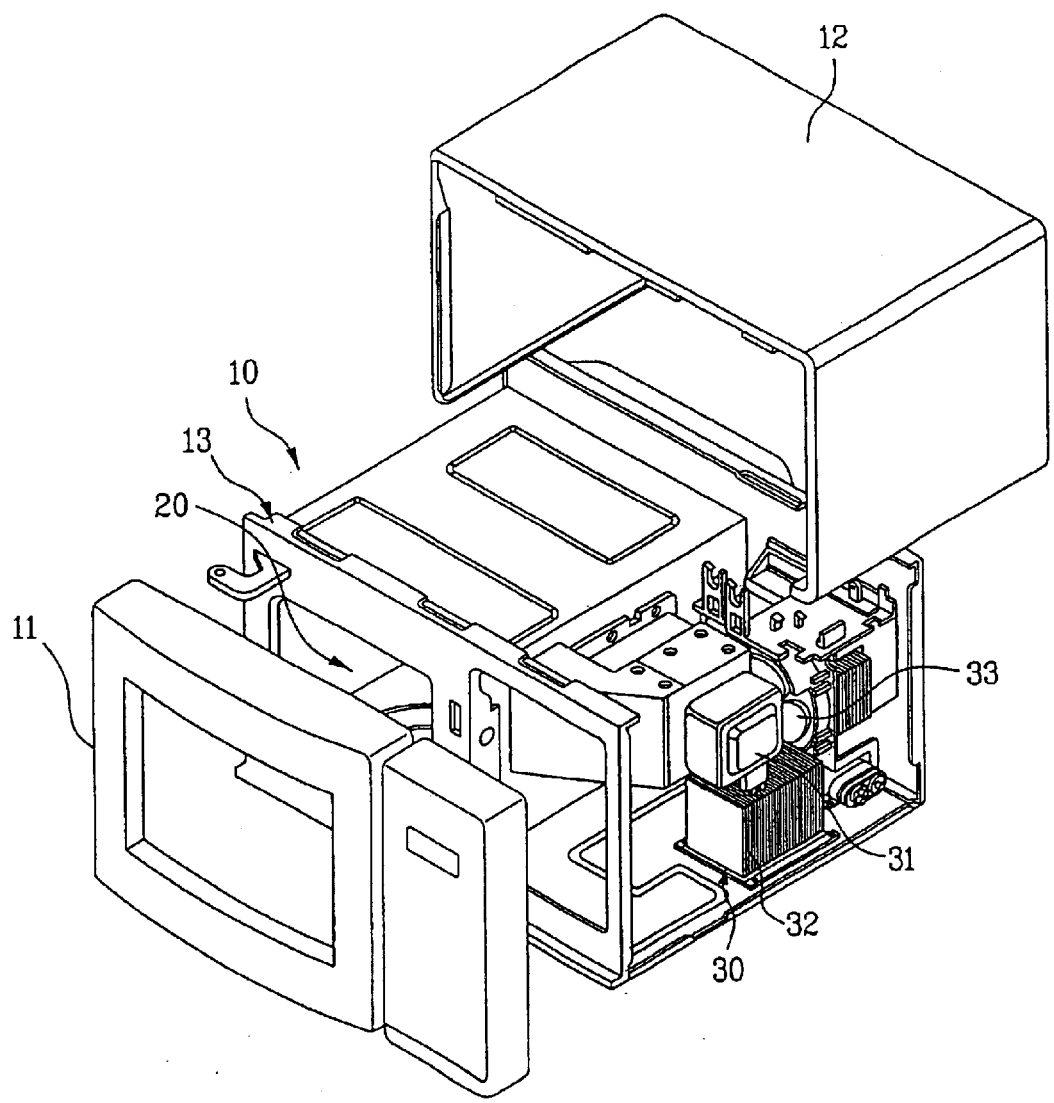
FIG. 1 illustrates an exploded perspective view of a related art microwave oven.
Figure 2:
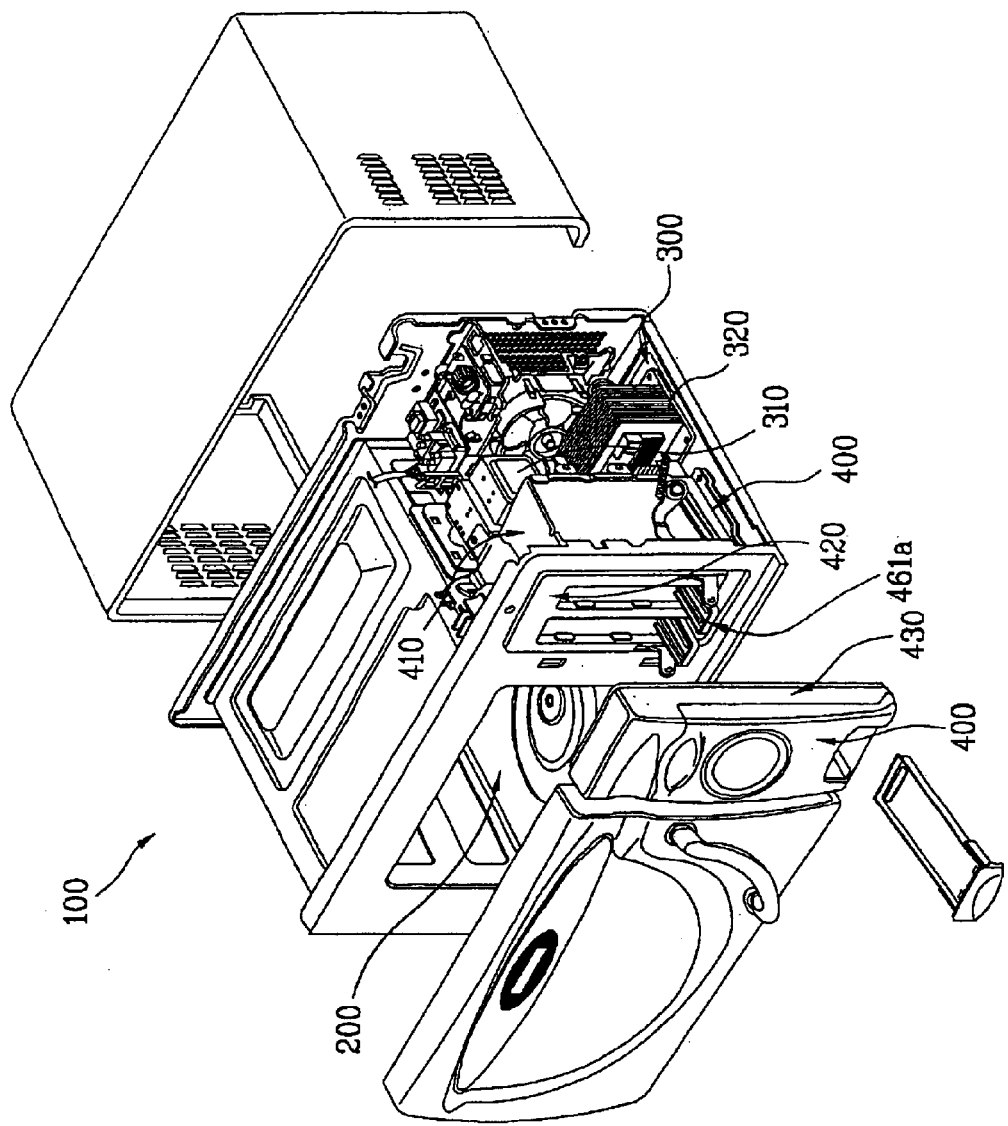
FIG. 2 illustrates an exploded perspective view of a microwave oven incorporating a toaster in accordance with the present invention.

FIG. 2 illustrates an exploded view of a microwave oven incorporating a toaster in accordance with the present invention. Referring to FIG. 2, the microwave oven includes a main body 100 forming the exterior surfaces of the microwave oven, a microwave cavity 200 provided within the main body 100, an electrical device chamber 300, and a toaster 400 provided adjacent to the microwave cavity 200 within the main body 100. A food object (e.g., food) arranged within the microwave cavity 200 may be heated by microwaves generated by various electrical devices arranged within the electrical device chamber 300. The various electrical devices include a magnetron 310 generating microwaves for heating the object and a high-voltage transformer 320 supplying high voltage to the magnetron 320. The toaster 400 may be arranged in front of the electrical device chamber 300 within the main body 100.

Figure 3:
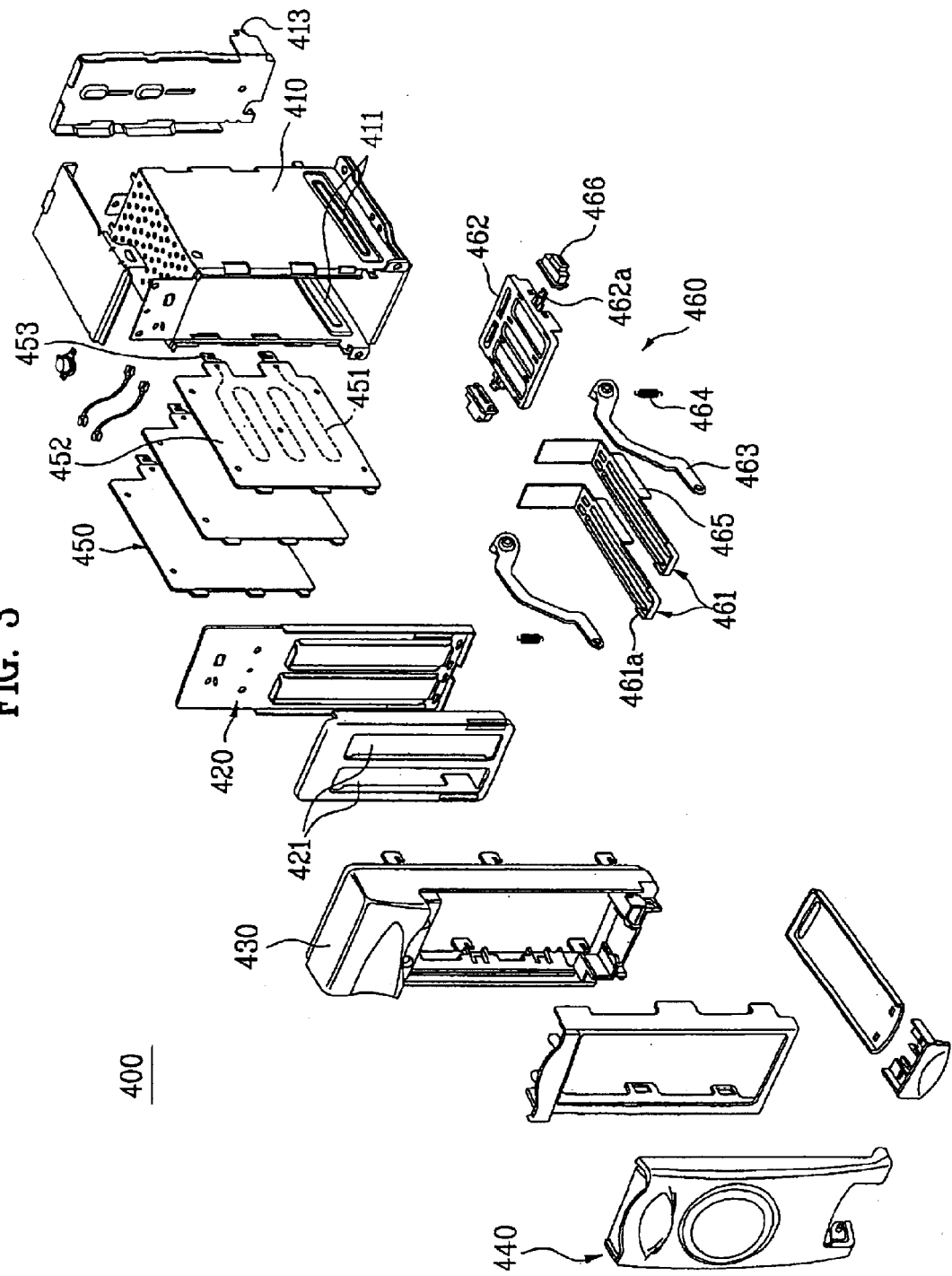
FIG. 3 illustrates an exploded perspective view of the toaster shown in FIG. 2.

FIG. 3 illustrates an exploded perspective view of the toaster 400 show in FIG. 2 in detail. The toaster 400 is an electrical device that applies heat to a food object (e.g., slice of bread or bagel). It includes a toaster case 410, a front case plate 420, a toaster panel 430, a toaster door 440, a heater assembly 450, and a tray assembly 460. The front side of the toaster case 410 is fully opened and the case 410 forms top, side, bottom, and rear surfaces of the toaster 400. A pair of slots 411 may be arranged within the sidewalls of the toaster case 410. The front case plate 420 is securely fastened to the front of the toaster 410, and it includes at least one toaster entrance 421 for inserting and removing a food object. The toaster panel 430 may be provided on a front side of the front case plate 420, and it forms the front side of the toaster 400. The toaster door 440 is rotatably coupled to the toaster panel 430 in order to open and close the toaster entrance 421.

The heater assembly 450 shown in FIG. 3 is provided within the toaster case 410 for heating the food object. It includes at least one heating plate 452 and a heating element (e.g., a heating wire) 451 provided on each heating plate 452. The heating element 451 is connected a power terminal 453, to which a power voltage is supplied.

The tray assembly 460 shown in FIG. 3 moves back and forth along the moving slots 411 arranged within the sidewalls of the toaster case 410 for moving the food object into the toaster case 410 or pulling out the food object from the toaster case 410. The tray assembly 460 includes at least one tray 461, a tray support 462, at least one elevating bracket 465 for each tray 461, a pair of connecting links 463, and a pair of springs 464. In one aspect of the present invention, the tray 461 may support a food item arranged vertically thereon (i.e., an orientation wherein a major surface of the food item is arranged vertically over the tray). Upon opening or closing the toaster door 440, the tray 461 enables the food item to be inserted into or removed from the interior of the toaster case 410. A support wall (461a) having a predetermined height may be provided at the front end of the tray 461 for stably supporting and positioning the food item at a desired location. The structure of the support wall 461a also prevents the food item from falling off from the tray 461, enabling the food item to be properly positioned within the toaster 400. The support wall 461a may be formed by bending the frontal edge of the tray 461 upward and by bending predetermined front portions of the left and right edges of the tray 461.

Each tray 461 is securely fastened on top of the tray support 462, which moves back and forth along the moving slots 411 for enabling the food item placed on the tray 461 to be inserted into or removed from the interior of the toaster case 410. Referring to FIG. 3, the tray support 462 includes two connecting parts 462a provided on left and right sides of the tray support 462. A busing 466 made of plastic material (e.g., Teflon) may be provided at the end of each connecting part 462a and be inserted into respective one of the moving slot 411. Each busing 466 supports the tray support 462 and has a shape allowing it to move within the moving slot 411 while preventing the tray support 462 from rotating with respect to the bushing 466 when the busing 466 is moving. The bushing may be rotatably connected to one end of the connecting lever 463, to which an end of the spring 464 is also connected.

The tray 461 comprises a plurality of fastening hooks (not illustrated) coupled to the elevating bracket 465 and a plurality of ventilation slits for heat circulation. The elevating bracket 465 may be arranged on a lower rear portion of the tray 461 between the tray 461 and the tray support 462, such that the elevating bracket 465 maintains a predetermined distance and a predetermined angle between the tray 461 and the tray support 462. The plurality of fastening hooks may be formed so as to extend both downward from the elevating bracket 465 and along a first direction, toward a front end of the tray 461. Alternatively, the fastening hooks may be formed so as to extend downward as described above and along a second direction toward a rear end of the tray 461. Additionally, a rear flange may be provided at the rear end of the tray 461 for supporting a backside of a food item. Accordingly, the food item may be stably positioned on the tray 461 by the rear flange when the toaster door is opened or closed. Referring to FIG. 3, a plurality of fastening slits may be arranged within a flat area of the tray support 462 and a plurality of air-openings may be provided between the fastening slits for allowing heat and air circulation. Generally, each of the fastening slits accommodate respective one of the fastening hooks of the tray 461 such that the tray 461 may be securely arranged on the tray support 462. For example, the tray 461 may be securely arranged on top of the tray support 462 upon inserting each of the fastening hooks into respective ones of the slits and pulling the tray 461 in the direction that the ends of the fastening hooks are extended.

Figure 4A:
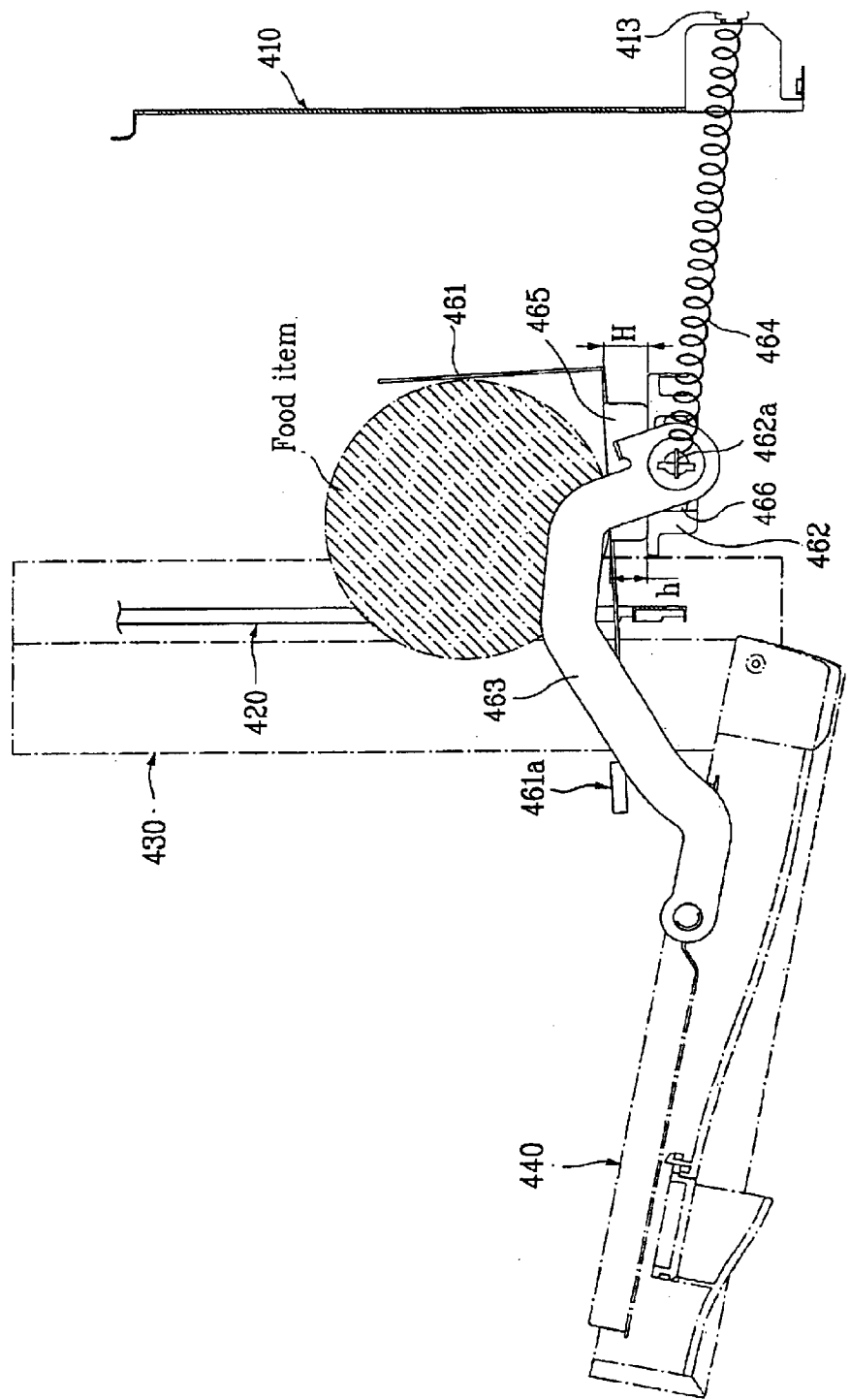
FIGS. 4A and 4B illustrate side views of the tray assembly of the toaster shown in FIG. 2 in operation.

The height of the front vertical edge of the elevating bracket 465 with respect to the tray support 462 (h in FIG. 4A) is less than the height of the rear vertical edge (H in FIG. 4A) such that the height of the front end of each tray 461 with respect to the tray support 462 is less than that of the rear end as shown in FIG. 4A. This declined orientation of the tray 461 enables the food item to slide toward the front end of the tray 461 so that it can be removed from the toaster case 410 easily.

Declined orientation of the tray 461 can be achieved in an alternative manner. For example, the moving slot 411 may be arranged to have a declined orientation with respect to ground. Then the orientations of the bushing 466 and the tray support 462 may be arranged to be parallel to the moving slot 411, so that declined orientation of the tray 461 can be achieved even when the height of the front vertical edge of the elevating bracket 465 wit respect to the tray support 462 (h in FIG. 4A) is identical to that of the rear vertical edge.

Referring back to FIG. 3, a first end of the connecting link 463 is rotatably coupled to the busing 466 and a second end the connecting link 463 is rotatably coupled to the toaster door 440. Therefore, when the toaster door 440 is opened or closed, the connecting link 463 moves the tray assembly 460 forward or backward. In addition, an end of the spring 464 is connected to a spring hook 413 provided at the rear side of the toaster case 410 and the other end of the spring 464 is connected to any one of the busing 466, the first end of the connecting link 463, and the end of the connecting part 462a. In operation, the spring 464 may exert a force on the first end of the connecting link 463 toward the spring hook 413 when the position (orientation) of the toaster door 440 is within a predetermined range (i.e., the second end of the connecting link 463 is positioned vertically higher than the first end of the connecting link 463), thereby biasing the toaster door 440 toward its closed position. In other words, when the toaster door 440 is closed or about to be closed, the spring 464 will exert a force on the toaster door 440 to be completely closed. On the other hand, if the toaster door 440 is completely opened so that the second end of the connecting link 463 is positioned vertically identical to or lower than the first end of the connecting link 463, the toaster door 440 will not be closed due to the spring force.

Figure 4B:
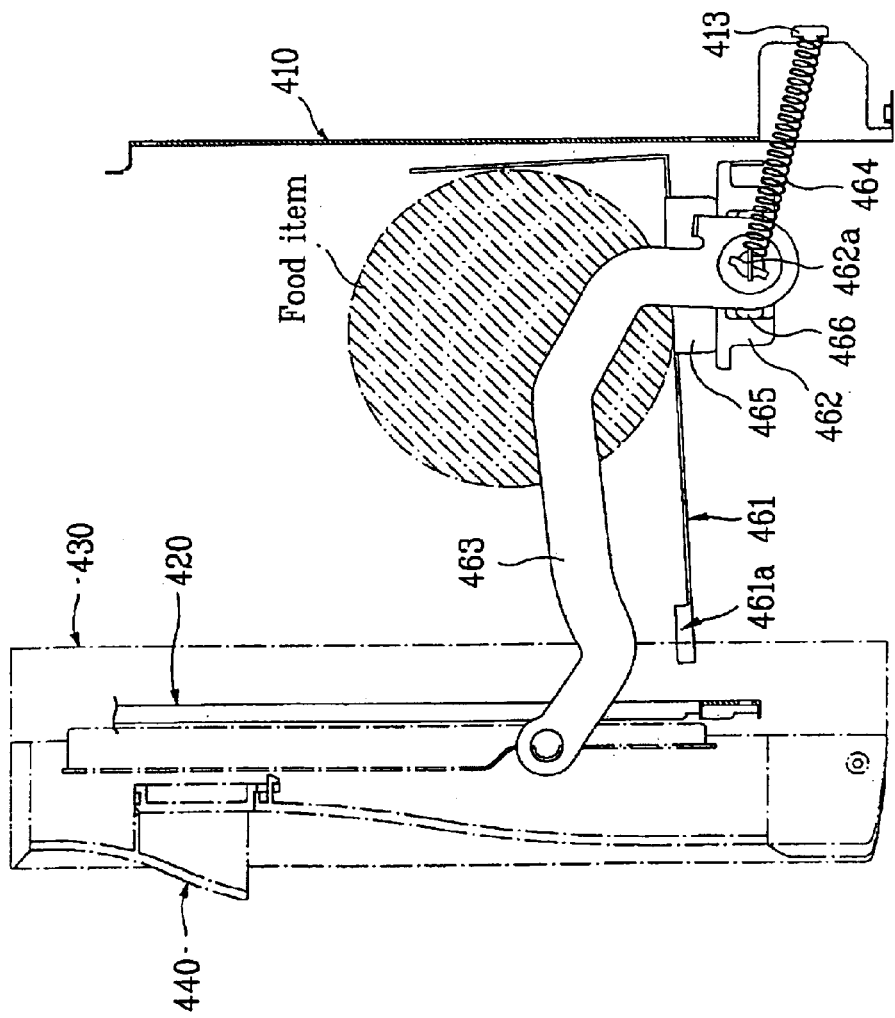

The operation of the microwave oven incorporating a toaster according to the present invention will now be described in detail with reference to FIG. 4A and FIG. 4B. When a user opens the toaster door 440 in order to place a food item within the toaster case 410, the connecting link 463 connected to the toaster door 440 moves forward, thereby moving the tray support 462 forward along the moving slot 411. Due to the movement of the tray support 452 and the fact that the tray 461 is securely arranged to the tray support 452, a predetermined portion of the tray 461 projects from the toaster entrance 421. In one aspect of the invention, the predetermined portion of the tray 461 projects from the toaster entrance 421 when the toaster door 440 is completely opened. Next, a food item may be arranged on the tray 461.

If the toaster door 440 is closed after the food item is arranged on the tray 461, the connecting link 463 moves backward to its original position, thereby moving the tray support 462 backward along the moving slot 411. Then, the tray 461, on which the food item is arranged, is positioned inside of the toaster case 410. Next, if power is supplied, the toaster 400 starts to toast the food item by generating heat from the heating elements 451 provided on the heating plates 452. Since each food item is placed on the tray 461, the entire food item may be heated uniformly.

After a predetermined period of time, when the user opens the toaster door 440 again in order to draw out the toasted food item from the toaster 400, the connecting link 463 moves forward, thereby projecting the predetermined portion of the tray 461 from the toaster entrance 421. At this time, the declined orientation of the tray 461 with respect to ground enables the toasted food item to slide down toward the front end of the tray 461. The support wall 461a provided at the front end of the tray 461 stably supports and position the food item, preventing the food item from falling off from the tray 461 when the toaster door 440 is opened or closed. Finally, the user may remove the food item positioned and supported by the support wall 461a from the toaster 400 easily. The declined orientation of the tray 461 is even more effective in positioning a relatively small food item toward the end of the tray 461 when the toaster door 440 is fully opened.

It is important to note that the structure of the tray assembly 460 according to the present invention is not limited only to a microwave oven incorporating a toaster. For example, it can be applied to an independent toasting assembly or device or to any appliance incorporating a toaster.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A tray assembly for a microwave oven incorporating a toaster, comprising:
   a microwave cavity;
   a toaster arranged adjacent to the microwave cavity;
   a tray support provided inside the toaster; and
   at least one tray securely provided on top of the tray support for holding a food item, the tray being declined toward a front end of the tray so as to enable the food item to slide toward the front end of the tray.

2. The tray assembly of claim 1, further comprising a support wall provided at the front end of the tray for supporting the food item so as to prevent the food item from falling off from the tray.

3. The tray assembly of claim 2, wherein the tray comprises at least one elevating bracket for maintaining a predetermined angle between the tray and the tray support.

4. The tray assembly of claim 3, wherein a first height of a front edge of the elevating bracket with respect to the tray support is less than a second height of a rear edge of the elevating bracket so as to form the declined orientation of the tray.

5. The tray assembly of claim 3, wherein the elevating bracket comprises at least one fastening hook extending downward and along a first direction parallel to the tray support.

6. The tray assembly of claim 5, wherein the tray support comprises at least one fastening slit for accommodating the at least one fastening hook.

7. The tray assembly of claim 3, wherein the tray further comprises a rear flange provided at a rear end of the tray for supporting a backside of the food item.

8. The tray assembly of claim 3, wherein the tray further comprises at least one ventilation slit for heat circulation.

9. The tray assembly of claim 1, wherein the tray support comprises a plurality of air-openings provided within a flat area of the tray support for heat circulation.

10. The tray assembly of claim 1, further comprising:
    a case for supporting the tray support;
    a moving slot arranged within the case, the moving slot being oriented parallel to the tray support; and
    a bushing provided within the moving slot for supporting the tray support and moving within the moving slot.

11. The tray assembly of claim 10, further comprising:
    a connecting link having a first end and a second end, the bushing being rotatably coupled to the first end; and
    a toaster door rotatably coupled to the second end, wherein the bushing and the tray support move forward as the toaster door is opened and move backward as the toaster door is closed.

12. The tray assembly of claim 10, wherein the moving slot is declined toward a front end of the moving slot.

13. The tray assembly of claim 12, wherein the tray comprises at least one elevating bracket for maintaining a predetermined distance between the tray and the tray support.

14. A toaster assembly, comprising:
a tray support;
at least one tray securely provided on top of the tray support for holding a food item, the tray being declined toward a front end of the tray so as to enable the food item to slide toward the front end of the tray;
at least one elevating bracket provided between the tray support and the at least one tray for maintaining a predetermined angle between the tray and the tray support; and
a support wall provided at the front end of the tray for supporting the food item so as to prevent the food item from falling off from the tray.

15. The toaster assembly of claim 14, wherein the tray comprises a rear flange provided at a rear end of the tray for supporting a backside of the food item.

16. The toaster assembly of claim 14, wherein the tray comprises at least one ventilation slit for heat circulation.

17. The toaster assembly of claim 14, wherein the tray support comprises a plurality of air-openings provided within a flat area of the tray support for heat circulation.

18. The toaster assembly of claim 14, further comprising:
a toaster case for supporting the tray support;
a moving slot arranged within the toaster case, the moving slot being oriented parallel to the tray support; and
a bushing provided within the moving slot for supporting the tray support and moving within the moving slot.

19. The toaster assembly of claim 18, further comprising:
a connecting link having a first end and a second end, the bushing being rotatably coupled to the first end; and
a toaster door rotatably coupled to the second end, wherein the bushing and the tray support move forward as the toaster door is opened and move backward as the toaster door is closed.

20. The toaster assembly of claim 18, wherein the moving slot is declined toward a front end of the moving slot.

* * * * *